United States Patent [19]

Repella

[11] 4,243,232

[45] Jan. 6, 1981

[54] ONE-PIECE OIL SEAL AND BOOT SEAL

[75] Inventor: James A. Repella, Gastonia, N.C.

[73] Assignee: Garlock Inc., Longview, Tex.

[21] Appl. No.: 89,175

[22] Filed: Oct. 29, 1979

Related U.S. Application Data

[63] Continuation of Ser. No. 658,775, Feb. 17, 1976, abandoned.

[51] Int. Cl.³ .............................................. F16J 15/32
[52] U.S. Cl. ...................................... 277/37; 277/65; 277/153; 277/212 FB
[58] Field of Search ....................... 277/92, 95, 65, 50, 277/37, 58, 35, 82, 152, 153, 182, 166, 212 R, 212 C, 212 F, 212 FB, 235 R; 308/36.1, 187.1, 187.2

[56] References Cited

U.S. PATENT DOCUMENTS

| | | | |
|---|---|---|---|
| 2,983,125 | 5/1961 | Peicküet al. | 277/65 |
| 2,992,027 | 7/1961 | Wright | 277/153 |
| 3,005,648 | 10/1961 | Christensen | 277/182 |
| 3,179,424 | 4/1965 | Carson et al. | 277/37 |
| 3,194,570 | 7/1965 | Haynie et al. | 277/153 X |
| 3,511,512 | 5/1970 | Wheelock | 277/153 |
| 3,531,168 | 9/1970 | Bainard | 277/153 X |
| 3,563,556 | 2/1971 | Scott | 277/153 |
| 3,801,111 | 4/1974 | Messenger | 277/58 |

FOREIGN PATENT DOCUMENTS 2414634 10/1974 Fed. Rep. of Germany ........... 277/153

Primary Examiner—Robert S. Ward, Jr.
Attorney, Agent, or Firm—Schovee & Boston

[57] ABSTRACT

A one-piece oil seal and boot seal including an oil seal portion with a sealing lip and a boot sleeve portion with at least one dust lip and preferably with both an intermediate dust lip and an outer dust lip. The one-piece construction overcomes the need for a separate assembly operation.

16 Claims, 3 Drawing Figures

ONE-PIECE OIL SEAL AND BOOT SEAL

This is a continuation of application Ser. No. 658,775, filed Feb. 17, 1976, now abandoned.

BACKGROUND OF THE INVENTION

1. Field of the Invention

This invention relates to oil seals and in particular to oil seals with axially outwardly extending boot sleeves with a dust lip.

2. Description of the Prior Art

Oil seals are known which have been combined with axially outwardly extending boot sleeves with dust lips to exclude dust, mud, water, etc. to protect the seal through which rotating and reciprocating shafts extend, see U.S. Pat. No. 3,801,111, for example. However, these boot sleeves have always been a separate part requiring an assembly operation.

It is an object of the present invention to provide a one-piece oil seal and boot sleeve having an oil seal portion with a sealing lip and with an elongated, shaft-encircling, elastomeric boot sleeve portion integral with the oil seal portion and preferably having an intermediate dust lip and an outer dust lip. It is a further object of this invention to eliminate the assembly operation required in prior art oil seals and boot seals, and to provide lower tool and part costs.

SUMMARY OF THE INVENTION

A One-piece oil seal and boot sleeve for sealing between a housing bore and a rotating and reciprocating shaft including an integral, molded oil seal portion with a sealing lip and a boot sleeve portion with one or more dust lips. The oil seal portion preferably includes an annular metal shell bonded to the elastomeric sealing element and providing a press fit in a housing bore. The boot sleeve portion may be axially collapsible and includes at least one dust lip. Preferably the boot sleeve includes an intermediate dust lip and also an outer dust lip, although the distal end need not be a dust lip and can be spaced away from a shaft extending through the seal, although in such case the distal end does provide a labyrinth seal with the intermediate dust lip.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

With reference now to the drawings, a one-piece seal 10 according to the present invention comprises an oil seal portion 12 and an elongated, shaft-encircling, elastomeric boot sleeve portion 14 integral with and axially longer than the oil seal portion 12 and extending axially outwardly from the oil seal portion.

Figure 1:
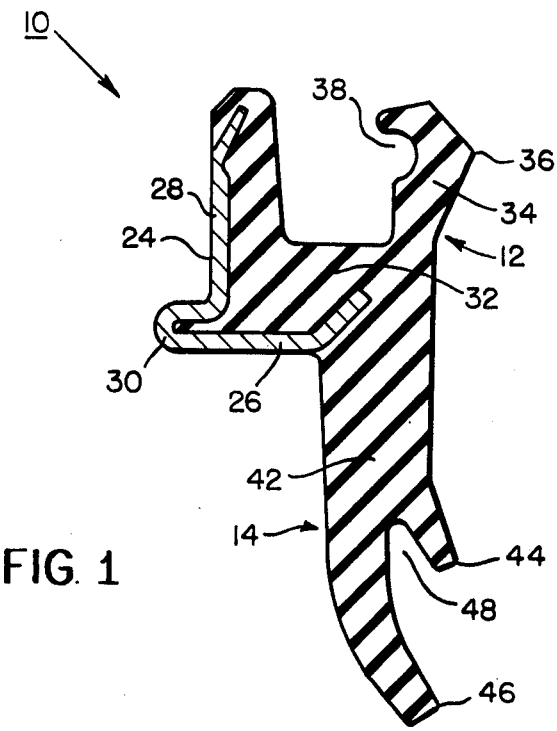
FIG. 1 is an enlarged, cross-sectional, fragmentary view of the one-piece seal of the present invention.
Figure 2:
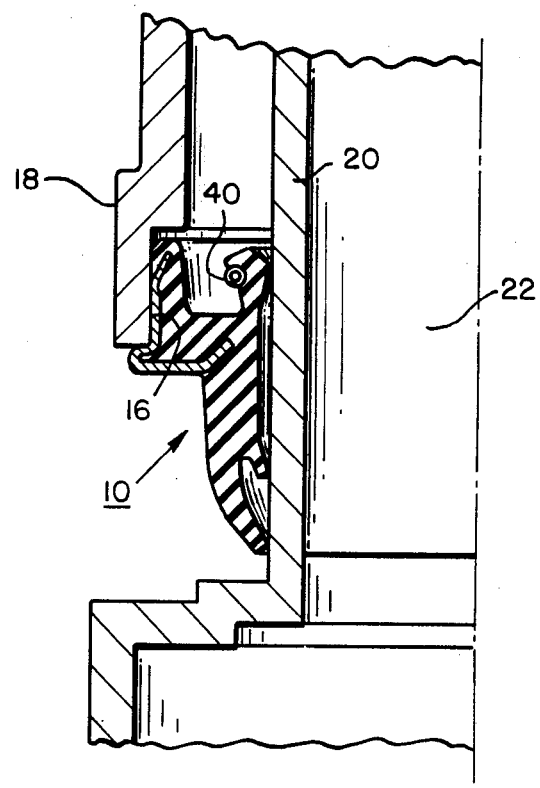
FIG. 2 is a partly broken-away, side view of the seal of FIG. 1 as installed in a preferred application thereof.

As shown in FIG. 2, the seal 10 is installed, in a preferred embodiment, in a bore 16 of a transmission housing 18 to provide a seal between the housing 18 and a rotating and reciprocating sleeve 20 splined or otherwise connected to and rotating with a rotating shaft 22.

The oil seal portion 12 of the seal 10 preferably includes an annular metal shell 24 having a radially inwardly extending flange 26, a cylindrical flange 28 and a radially outwardly extending abutting flange 30. Bonded to the metal shell 24 is a main elastomeric body portion 32 having an oil seal element 34 with a sealing lip 36 and a groove 38 for a garter spring 40 (shown in FIG. 2) of any type well-known in the oil seal art.

The boot sleeve portion 14 includes a cylindrical main elastomeric sleeve body 42 having an intermediate dust lip 44 and an outer dust lip 46 at the distal end of the boot sleeve portion 14. The main sleeve body 42 tapers from a wider thickness at the proximal end thereof to a narrower thickness at the distal end of each of the dust lips 44 and 46. Both of the dust lips 44 and 46 extend axially outwardly and radially inwardly away from the metal shell 24 and form approximately the same acute angle with the shaft 22 (as well as with the axis of the seal 10). The main sleeve body 42 curves radially inwardly from its proximal to its distal end. The intermediate dust lip 44 extends radially inwardly as a separate sealing element and is provided with a predetermined amount of flexibility by virtue of the radially outwardly and axially inwardly directed groove 48 in the main sleeve body 42 radially outwardly of the intermediate dust lip 44.

The boot sleeve portion may be axially collapsible, as when it is used in an application when it can be contacted by a yoke of a reciprocating shaft. In such case, it can be made thinner and more flexible than when used in applications where it does not need to be axially collapsible. The boot sleeve preferably has at least one dust lip. The distal end need not be a dust lip and can be spaced away from the shaft (or shaft sleeve 20) although in such cases it preferably forms a labyrinth type of seal with the intermediate dust lip 44. The volume between the oil seal lip 36 and the intermediate dust lip 44 can be grease packed if desired. While the boot sleeve portion is shown as being axially longer than the oil seal portion, it can be of any suitable axial length.

Figure 3:
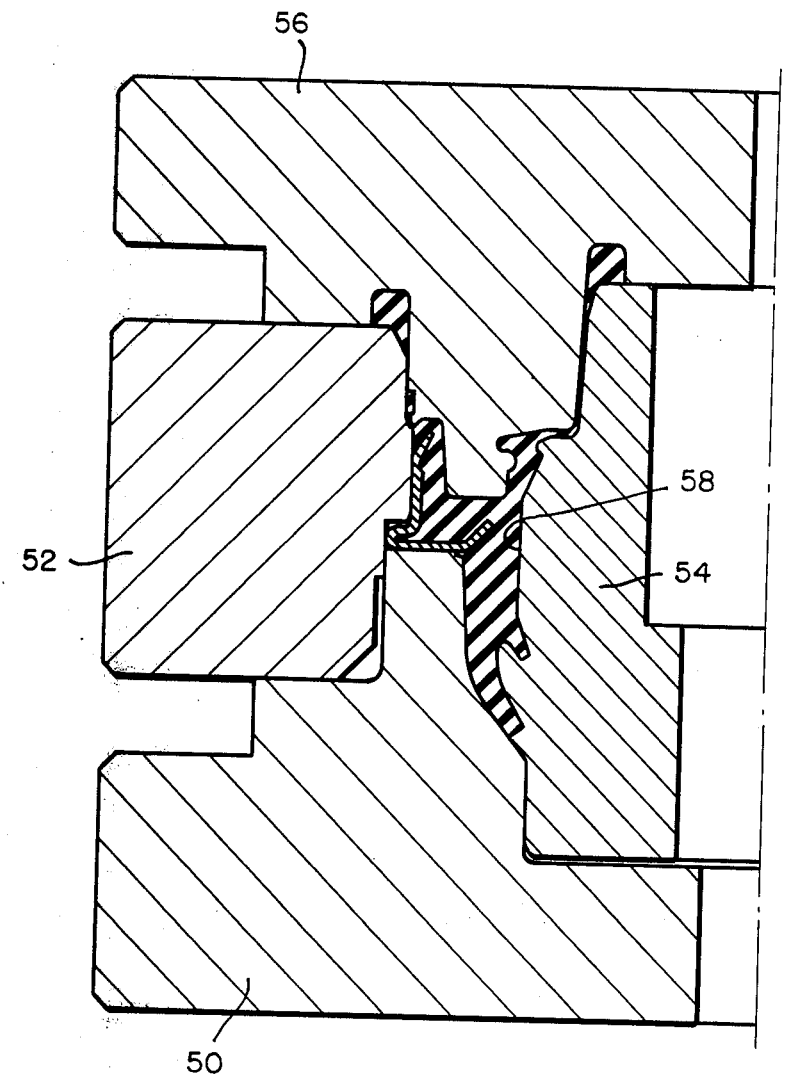
FIG. 3 is a fragmentary, cross-sectional view of a mold for use in forming the oil seal of the present invention.

The seal 10 is preferably molded as shown in FIG. 3 in a mold including a lower portion 50, a center ring 52, an inner portion 54 and an upper portion 56, the nature and operation of which mold parts are well-known to those skilled in the art. The metal shell 24 is placed in the mold as shown and a blank rubber prep form of elastomeric material can then be placed above the cavity 58 and below the upper portion 56 and then the upper portion is lowered forcing the elastomeric material into the cavity 58 forming the desired shape of the seal 10. The elastomeric material is bonded to the metal shell 24 by heat and pressure in any manner well-known to those skilled in the art and which need not be described in detail here.

As will be evident by those skilled in the art, the present invention overcomes the prior art problem, in providing an oil seal with an outwardly extending boot sleeve, of requiring a separate assembly operation, and thus the present invention results in lower tool costs and lower parts costs for such a seal.

The invention has been described in detail with particular reference to certain preferred embodiments thereof, but it will be understood that variations and modifications can be effected within the spirit and scope of the invention as described hereinabove and as defined in the appended claims.

I claim:
1. Apparatus comprising:
   (a) a housing having a bore,
   (b) a shaft extending through said bore and adapted for relative movement with respect to said housing;
   (c) a seal mounted in said bore for sealing the annular space between said bore and shaft, said seal comprising;
      (1) an oil seal portion and a boot sleeve portion integral with said oil seal portion and extending axially outwardly from said oil seal portion;
      (2) said oil seal portion including a mounting portion and a sealing element, said mounting portion including an annular metal shell and said sealing element including an elastomeric body portion bonded to said metal shell, said sealing element also including an annular sealing lip in sealing contact with said shaft;
      (3) said boot sleeve portion including an elongated, shaft-encircling, elastomeric, tubular sleeve extending axially outwardly from said oil seal portion, said elastomeric sleeve being part of an annular, one-piece, elastomeric body which also includes said elastomeric body portion of said sealing element;
      (4) said sleeve having a distal end portion, and said sleeve tapering axially outwardly and radially inwardly toward said distal end portion; said sleeve being flexible and being axially collapsible such that said distal end portion can move axially inwardly by flexing of said sleeve; said distal end portion having an I.D. greater than the I.D. of said shaft such that said distal end portion is spaced away from and out of contact with said distal end portion including the entire end portion of said sleeve including all sleeve surfaces and edges where said surfaces meet and including both the radially outwardly and the radially inwardly facing surfaces thereof;
      (5) said seal also including an annular, elastomeric, intermediate dust lip integral with said elastomeric body and extending radially inwardly and axially outwardly from a radially inner surface of said elastomeric body, said intermediate dust lip being separate from said distal end portion and being located axially inwardly therefrom, and the lip of said intermediate dust lip being located closer to the distal end of said distal end portion than to said sealing lip, said intermediate dust lip being in contact with said shaft; and
      (6) said elastomeric body also including an annular groove directly radially outwardly of said intermediate dust lip in the radially inner surface of said elastomeric body, said groove extending radially outwardly and axially inwardly up into said elastomeric body, whereby said intermediate dust lip can flex radially outwardly into said groove.

2. The apparatus as recited in claim 1 wherein the axial length of said boot sleeve portion is greater than the axial length of said oil seal portion.

3. The apparatus as recited in claim 1 wherein said sleeve has a proximal, longer generally cylindrical section and a distal, shorter section that tapers radially inwardly.

4. The apparatus as recited in claim 1 wherein said shell has a radially outwardly extending positioning flange having an axially inwardly facing surface in contact with said housing.

5. A seal for sealing the annular space between a housing bore and a shaft extending through the housing bore, said seal comprising:
   (a) an oil seal portion and a boot sleeve portion integral with said oil seal portion and extending axially outwardly from said oil seal portion;
   (b) said oil seal portion including a mounting portion and a sealing element, said mounting portion including an annular metal shell and said sealing element including an elastomeric body portion bonded to said metal shell, said sealing element also including an annular sealing lip adapted to sealingly contact a shaft extending through the seal;
   (c) said boot sleeve portion including an elongated, shaft-encircling, elastomeric, tubular sleeve extending axially outwardly from said oil seal portion, said elastomeric sleeve being part of an annular, one-piece, elastomeric body which also includes said elastomeric body portion of said sealing element;
   (d) said sleeve having a distal end portion, and said sleeve tapering axially outwardly and radially inwardly toward said distal end portion; said sleeve being flexible and being axially collapsible such that said distal end portion can move axially inwardly by flexing of said sleeve; said distal end portion having an I.D. larger than the designed operating I.D. of said sealing lip such that said distal end portion is adapted to not contact a shaft extended through said seal; said distal end portion including the entire end portion of said sleeve including all sleeve surfaces and edges where said surfaces meet and including both the radially outwardly and the radially inwardly facing surfaces thereof;
   (e) said seal also including an annular, elastomeric, intermediate dust lip integral with said elastomeric body and extending radially inwardly and axially outwardly, from a radially inner surface of said elastomeric body, said intermediate dust lip being separate from said distal end portion and being located axially inwardly therefrom, and the lip of said intermediate dust lip being located closer to the distal end of said distal end portion than to said sealing lip, said intermediate dust lip having an I.D. such that it will contact a shaft extending through said seal; and
   (f) said elastomeric body also including an annular groove directly radially outwardly of said intermediate dust lip in the radially inner surfacr of said elastomeric body, said groove extending radially outwardly and axially inwardly up into said elastomeric body, whereby said intermediate dust lip can flex radially outwardly into said groove.

6. The seal as recited in claim 5 wherein the axial length of said boot sleeve portion is greater than the axial length of said oil seal portion.

7. The seal as recited in claim 5 wherein said sleeve has a proximal, longer, generally cylindrical section and a distal, shorter section that tapers radially inwardly.

8. The seal as recited in claim 5 wherein said shell has a radially outwardly extending positioning flange having an axially inwardly facing surface adapted to contact a housing.

9. Apparatus comprising:
(a) a housing having a bore,
(b) a shaft extending through said bore and adapted for relative movement with respect to said housing;
(c) a seal mounted in said bore for sealing the annular space between said bore and shaft, said seal comprising;
  (1) an oil seal portion and a boot sleeve portion integral with said oil seal portion and extending axially outwardly from said oil seal portion;
  (2) said oil seal portion including a mounting portion and a sealing element, said mounting portion including an annular metal shell and said sealing element including an elastomeric body portion bonded to said metal shell, said sealing element also including an annular sealing lip in sealing contact with said shaft;
  (3) said boot sleeve portion including an elongated, shaft-encircling, elastomeric, tubular sleeve extending axially outwardly from said oil seal portion, said elastomeric sleeve being part of an annular, one-piece, elastomeric body which also includes said elastomeric body portion of said sealing element;
  (4) said sleeve having a distal end portion, and said sleeve tapering axially outwardly and radially inwardly toward said distal end portion; said sleeve being flexible and being axially collapsible such that said distal end portion can move axially inwardly by flexing of said sleeve; said distal end portion having an outer dust lip in contact with said shaft, said distal end portion including the entire end portion of said sleeve including all sleeve surfaces and edges where said surfaces meet and including both the radially outwardly and the radially inwardly facing surfaces thereof;
  (5) said seal also including an annular, elastomeric, intermediate dust lip, integral with said elastomeric body and extending radially inwardly and axially outwardly from a radially inner surface of said elastomeric body, said intermediate dust lip being separate from said distal end portion and being located axially inwardly therefrom, and the lip of said intermediate dust lip being located closer to said outer dust lip than to said sealing lip, said intermediate dust lip being in contact with said shaft; and
  (6) said elastomeric body also including an annular groove directly radially outwardly of said intermediate dust lip in the radially inner surface of said elastomeric body, said groove extending radially outwardly and axially inwardly up into said elastomeric body, whereby said intermediate dust lip can flex radially outwardly into said groove.

10. The apparatus as recited in claim 9 wherein the axial length of said boot sleeve portion is greater than the axial length of said oil seal portion.

11. The apparatus as recited in claim 9 wherein said sleeve has a proximal, longer, generally cylindrical section and a distal, shorter section that tapers radially inwardly.

12. The apparatus as recited in claim 9 wherein said shell has a radially outwardly extending positioning flange having an axially inwardly facing surface in contact with said housing.

13. A seal for sealing the annular space between a housing bore and a shaft extending through the housing bore, said seal comprising:
(a) an oil seal portion and a boot sleeve portion integral with said oil seal portion and extending axially outwardly from said oil seal portion;
(b) said oil seal portion including a mounting portion and a sealing element, said mounting portion including an annular metal shell and said sealing element including an elastomeric body portion bonded to said metal shell, said sealing element also including an annular sealing lip adapted to sealingly contact a shaft extending through the seal;
(c) said boot sleeve portion including an elongated, shaft-encircling, elastomeric, tubular sleeve extending axially outwardly from said oil seal portion, said elastomeric sleeve being part of an annular, one-piece, elastomeric body which also includes said elastomeric body portion of said sealing element;
(d) said sleeve having a distal end portion, and said sleeve tapering axially outwardly and radially inwardly toward said distal end portion; said sleeve being flexible and being axially collapsible such that said distal end portion can move axially inwardly by flexing of said sleeve; said distal end portion having an outer dust lip having an I.D. such that said outer dust lip will contact a shaft extending through said seal and in sealing contact with said sealing lip; said distal end portion including the entire end portion of said sleeve including all sleeve surfaces and edges where said surfaces meet and including both the radially outwardly and the radially inwardly facing surfaces thereof;
(e) said seal also including an annular, elastomeric, intermediate dust lip integral with said elastomeric body and extending radially inwardly and axially outwardly from a radially inner surface of said elastomeric body, said intermediate dust lip being separate from said distal end portion and being located axially inwardly therefrom, and the lip of said intermediate dust lip being located closer to said outer dust lip than to said sealing lip, said intermediate dust lip having an I.D. such that it will contact a shaft extending through said seal and in sealing contact with said sealing lip; and
(f) said elastomeric body also including an annular groove directly radially outwardly of said intermediate dust lip in the radially inner surface of said elastomeric body, said groove extending radially outwardly and axially inwardly up into said elastomeric body, whereby said intermediate dust lip can flex radially outwardly into said groove.

14. The seal as recited in claim 13 wherein the axial length of said boot sleeve portion is greater than the axial length of said oil seal portion.

15. The seal as recited in claim 13 wherein said sleeve has a proximal, longer, generally cylindrical section and a distal, shorter section that tapers radially inwardly.

16. The seal as recited in claim 13 wherein said shell has a radially outwardly extending positioning flange having an axially inwardly facing surface adpated to contact a housing.

* * * * *

UNITED STATES PATENT AND TRADEMARK OFFICE
CERTIFICATE OF CORRECTION

PATENT NO. : 4,243,232
DATED : January 6, 1981
INVENTOR(S) : James A. Repella

It is certified that error appears in the above-identified patent and that said Letters Patent are hereby corrected as shown below:

In claim 5 (f), line 3, delete "surfacr" and insert therefor --surface--.

In Claim 16, line 3, delete "adpated" and insert therefor --adapted--.

Signed and Sealed this

Seventh Day of April 1981

[SEAL]

Attest:

RENE D. TEGTMEYER

Attesting Officer     Acting Commissioner of Patents and Trademarks

UNITED STATES PATENT OFFICE
CERTIFICATE OF CORRECTION

PATENT NO. : 4,243,232
DATED : January 6, 1981
INVENTOR(S) : James A. Repella

It is certified that error appears in the above-identified patent and that said Letters Patent are hereby corrected as shown below:

In Claim 1(c)(4), line 7, delete "I.D." second occurrence and insert therefor --O.D.--.

In Claim 1(c)(4), line 9, after "said" insert --shaft, said--.

Signed and Sealed this

Second Day of June 1981

[SEAL]

Attest:

RENE D. TEGTMEYER

Attesting Officer

Acting Commissioner of Patents and Trademark